United States Patent [19]

Pasman et al.

[11] Patent Number: 4,959,822
[45] Date of Patent: Sep. 25, 1990

[54] RECORD-CARRIER BODY PROVIDED WITH A RELIEF STRUCTURE OF OPTICALLY DETECTABLE SERVO-TRACK PORTIONS AND SECTOR ADDRESSES AND APPARATUS FOR FORMING SAID STRUCTURE

[75] Inventors: Johannes H. T. Pasman; Nicolaas C. J. A. Van Hijningen, both of Eindhoven, Netherlands

[73] Assignee: U.S. Philips Corporation, New York, N.Y.

[21] Appl. No.: 410,691

[22] Filed: Sep. 21, 1989

Related U.S. Application Data

[62] Division of Ser. No. 735,005, May 17, 1985, Pat. No. 4,893,298.

[30] Foreign Application Priority Data

Jan. 22, 1985 [NL] Netherlands .......................... 8500153

[51] Int. Cl.$^5$ ........................... G11B 7/24; G11B 7/26
[52] U.S. Cl. ............................... 369/44.11; 369/275.1; 369/109

[58] Field of Search ............... 369/275, 109, 111, 284, 369/286, 277, 278, 279, 93, 44–47, 110, 116, 121

[56] References Cited

U.S. PATENT DOCUMENTS

| | | | |
|---|---|---|---|
| 4,325,135 | 4/1982 | Dil et al. | 369/275 X |
| 4,499,574 | 2/1985 | Braat | 369/275 |
| 4,853,912 | 8/1989 | Akasaka et al. | 365/122 X |

Primary Examiner—Stuart S. Levy
Assistant Examiner—Hoa Nguyen
Attorney, Agent, or Firm—Leroy Eason

[57] ABSTRACT

A record carrier body is disclosed which is, provided with sector addresses and servo-track portions. The maximum width of the servo-track portions is at least 60% of the track period, in a direction transverse to the track direction, and is at least of the order of twice the maximum width of the sector-address areas. This makes it possible to obtain an improved tracking signal in addition to a satisfactory address signal. An improved information signal can be obtained by recording the information in the lands between the servo tracks. An apparatus is disclosed for recording sector addresses and servo track portions on the record carrier body.

2 Claims, 4 Drawing Sheets

RECORD-CARRIER BODY PROVIDED WITH A RELIEF STRUCTURE OF OPTICALLY DETECTABLE SERVO-TRACK PORTIONS AND SECTOR ADDRESSES AND APPARATUS FOR FORMING SAID STRUCTURE

This is a division of application Ser. No. 735,005, filed May 17, 1985, now U.S. Pat. No. 4,893,298.

The invention relates to a record-carrier body in which a user can record information by means of optical radiation. Such a record-carrier body comprises a substrate with a recording layer on said substrate and is provided with a preformed optically detectable relief structure of servo-track portions and sector addresses. The sector addresses contain address information about associated recordable portions of the record-carrier body in the form of optically detectable areas which alternate with intermediate areas. The areas in the sector addresses have a different phase depth than the servo-track portions. The invention also relates to an apparatus for recording a structure in conformity with the relief structure of sector addresses and servo-track portions of said record-carrier body.

The record-carrier body may be a circular disc-shaped substrate carrying a recording layer in which optically detectable changes can be produced by a radiation beam of sufficiently high intensity. The servo-track portions may comprise grooves recessed in the substrate surface or ridges formed on the substrate surface, and the sector-address areas may comprise pits recessed in the substrate surface or hills formed on this surface. The sector addresses may be situated between successive servo track portions, viewed in the track direction, so as to form one composite track. This track extends over the entire surface area of the recording layer and is preferably a spiral track, but alternatively it may comprise a multitude of concentric tracks.

When the sector addresses and servo track portions are exposed to a radiation beam which is focussed to form a small radiation spot, the beam is split into a zero-order subbeam, first-order subbeams and higher-order subbeams. Herein, phase depth is to be understood to mean the phase difference between the zero-order subbeam and a first-order subbeam. This phase depth is determined by the geometry of the sector-address areas and the servo-track portions, inter alia by the depth or height of these areas and track portions.

Such a record-carrier body is known inter alia from U.S. Pat. No. 4,363,116. As described in said Patent, the servo-track portions are employed during the recording of information by the user for detecting and correcting the radial position of a radiation spot formed on the recording layer by a radiation beam. This enables the requirements imposed on the drive and guide mechanisms, for moving the write spot and the record carrier body relative to each other, to be less stringent so that the write apparatus can be simpler and cheaper.

Preferably, the radial position of the radiation spot relative to a servo-track portion is detected by means of the "push-pull" or differential method. This method employs two radiation-sensitive detectors, which are arranged in the path of the radiation beam coming from the record carrier body and which receive radially different portions of this beam. The difference between the output signals of the two detectors contains information about the radial position of the radiation spot relative to the servo-track portion. If the output signals are equal, the center of the radiation spot coincides with the central axis of the servo-track portion. The differential tracking method may be employed only if the servo grooves have a depth or the servo ridges have a height such that their phase depth is of the order of 90°.

The sector-address areas are read using the "Central-Aperture" or integral method. In accordance with this method the variation of the overall intensity of the radiation originating from the record carrier body and traversing an objective system is detected by means of a single detector arranged on the optical axis or by means of the two detectors employed for tracking, whose output signals are added to each other. For an optimum read-out of the sector addresses the areas therein should have a phase depth of approximately 180°.

It has been found that, in addition to the phase depth, the width, measured in the direction transverse to the track direction, of the servo-track portions and the sector-address areas also has a substantial influence on the amplitudes of the signals obtained when the user information is recorded. In the record-carrier body disclosed in U.S. Pat. No. 4,363,116, which is intended to be scanned by means of a radiation spot whose half-intensity value is approximately 800 nm, the servo-track portions and the sector-address areas have a width of approximately 600 nm, while the period, transverse to the track direction, of the track structure is approximately 1600 nm. The half-intensity value of a radiation spot, if this spot has a Gaussian intensity distribution, is equal to the distance between two points where the intensity is $1/e^2$ of the intensity in the center of the radiation spot. By means of the known record-carrier body it is possible to obtain a differential tracking signal of moderate signal amplitude.

It is an object of the invention to provide a record-carrier body which, when scanned for the purpose of information recording, produces a differential tracking signal of substantially higher signal amplitude. It is another object of the invention to obtain an improved information signal of higher signal amplitude when the information areas recorded by the user are read in accordance with the integral read method.

In accordance with a first aspect of the invention the record-carrier body is characterized in that the maximum width of the servo-track portions is at least 60% of the track period, transverse to the track direction, and is at least of the order of twice the maximum width of the sector-address areas.

The use of the concept "maximum width" is related to the fact that the servo grooves or ridges and the sector-address pits or hills need not have perpendicular walls, but in practice generally have oblique walls. The maximum width is then the width at the location of the recording-layer surface which is remote from the substrate. Apart from a maximum width, the servo grooves and sector-address pits also have an effective width. The shallow servo grooves are generally V-shaped in cross-section. For such a groove shape the effective width is half the maximum width. The deeper pits in the sector addresses are frequently trapezoidal. For such pits the effective width is equal to half the sum of the maximum width and the minimum width.

The invention is based on the recognition of the fact that for a maximum amplitude of the differential tracking signal, the effective width of the servo-track portions should be of the order of half the track period, while for a maximum amplitude of the integral read signal produced by the sector address areas the effective width of these areas should be of the order of one third of the track period. Until now, in the manufacture of the master disc for such record-carrier bodies, a single radiation spot was used for recording both the sector addresses and the servo-track portions. In accordance with the invention, on the other hand, and two radiation spots of different dimensions are used, so that the sector-address areas and the servo-track portions each can be given their optimum widths, which differ from each other.

It is to be noted that European Patent Application No. 0,100,995 describes a record-carrier body provided with servo-track portions in the form of grooves and sector addresses in the form of pits. In said Patent Application it is stated that the width of the servo grooves may be equal to or larger than the width of the pits in the sector addresses. However, said European Patent Application deals with the problem that at the location of the sector addresses a satisfactory tracking by means of the differential method is not possible if the pits of the sector addresses have a depth of $\lambda/4$, which corresponds to a phase depth of 180° for pits having straight walls. Here, $\lambda$ is the wavelength of the radiation beam used for reading the addresses and recording the user information. In order to solve this problem it is proposed to give the pits of the sector addresses the same depth as the servo grooves, i.e. a depth of the order of an odd multiple of $\lambda/8$, which corresponds to a phase depth of approximately 90° for pits having straight walls. In this record carrier body the phase depths of the pits and the grooves therefore are not different as in the record carrier body in accordance with the present invention. Moreover, which is even more important, the ratio between the widths of the servo-track portions and the sector-address areas in the record carrier body in accordance with European Patent Application No. 0,100,995 differs from that in the record-carrier body proposed in the present Application.

In European Patent Application No. 0,100,995 the widths are expressed as the half-intensity width $W_o$ of the scanning spot. The servo grooves have a width of $W_o/2$ and the pits of the sector addresses have a width of $W_o/3$, so that the width of the sector address servo grooves is approximately 1.5 times the width of the pits. In a record carrier body in accordance with a preferred embodiment of the invention, which is intended to be scanned by means of a radiation spot whose half-intensity width is approximately 800 nm, the width of the servo-track portions is approximately 1200 nm, or $3/2 \cdot W_o$, and that of the sector address pits is approximately 600 nm, or $\frac{3}{4} \cdot W_o$. Further, European Patent Application No. 0,100,995 does not mention anything about the relation between the maximum track width and the track period.

In accordance with a second aspect of the invention the presence of two radiation spots, for recording the servo-track areas and the sector addresses, respectively is utilized in order to increase the amplitude of the signal obtained during the subsequent read-out of the information recorded by the user. In accordance with this aspect a record carrier in accordance with the invention is characterized in that the servo-track portions constitute continuous tracks and the sector addresses are situated between servo tracks which are situated adjacent each other in a direction transverse to the track direction.

In this record carrier body a user does not record the information in the servo-track portions, as was customary until now, but in the lands between the servo tracks, i.e. on flat parts of the recording layer. As a result of this, the information areas, which comprise melted-away portions of the recording layer, can be detected better than in the case where these areas are situated in the servo grooves.

The invention further relates to an apparatus for forming a structure of sector addresses and servo-track areas on a photo-sensitive layer of a master disc. This apparatus comprises a radiation-source system for producing two radiation beams, a separate intensity modulator for each of the beams, and an objective system for focussing the beams to form two radiation spots of different dimensions. The smaller radiation spot is employed for recording the sector addresses and the larger radiation spot for recording the servo-track portions.

It is to be noted that it is known from U.S. Pat. No. 4,027,330 to employ two radiation spots for simultaneously recording information areas and a servo track. In accordance with U.S. Pat. No. 4,027,330, however, the wider radiation spot is employed for recording broader information areas and the narrower radiation spot for recording a narrow servo track. The information areas have the form of locally widened portions of the servo track and are distributed over the entire length of the servo track and hence do not constitute sector-address areas.

The apparatus in accordance with the invention may be characterized further in that viewed in a direction transverse to the longitudinal direction of the servo-track portions to be recorded, the two radiation spots have the same position.

However, preferably the apparatus is characterized further in that viewed in a direction transverse to the longitudinal direction of the servo-track portions to be recorded the two radiation spots are shifted relative to one another.

The sector addresses are then recorded between the turns of the servo track. The user information is subsequently also recorded in these lands, which enables the information areas to be read more effectively by means of the integral read method.

Reading the sector addresses and recording information in a record carrier body having continuous servo tracks and sector addresses situated between these tracks, requires a write-read apparatus modified in accordance with the invention. Such an apparatus comprises a radiation-source system for producing a single or double write-read beam, an intensity modulator arranged in the path of the beam, and an objective system for focussing the beam to form a single or double write/read spot. The apparatus is further provided with an auxiliary beam for the purpose of tracking. The auxiliary beam is focused by means of the objective system to form an auxiliary radiation spot which, viewed in a direction transverse to the direction of a servo track, is shifted relative to the single or double write/read spot over a distance equal to half the track period in a direction transverse to the track direction.

After the user has recorded information in the record-carrier body in accordance with the preferred embodiment, a record carrier is obtained which is characterized by continuous servo tracks between which sector addresses are situated, information areas being recorded between successive sector addresses, viewed in the track direction.

Embodiments of the invention will now be described in more detail, by way of example, with reference to the accompanying drawings wherein.

Figure 1:
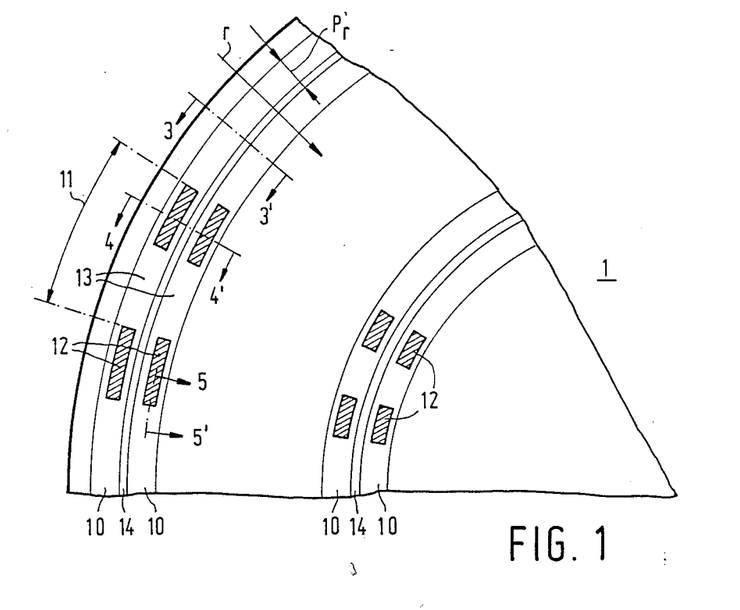
FIG. 1 is a plan view of a part of a record carrier body in accordance with a first embodiment of the invention.

The record-carrier body 1 shown in FIG. 1 comprises, for example, a spiral track 10 having a multitude of turns only two of which are shown in the figure. Each turn of the track is divided into a large number of sectors, for example 64 or 128. Each sector comprises a servo-track portion 13, in which a user can record information, and a sector address 12, in which inter alia the address of the associated servo-track portion 13 is encoded in digital form in optically readable areas 15 shown in FIG. 2. Both these areas and the servo-track portions 13 can be detected optically, so that before a block of information is recorded the desired address can be detected and, both before and during recording, steps can be taken to ensure that a write spot accurately follows the servo-track portions. The record-carrier body 1 has a recording layer which is subjected to an optically detectable change when it is exposed to radiation of sufficiently high intensity.

The method in which and the apparatus by means of which, during the recording of the information by the user, the addresses are read and the servo track portions are followed and the manner in which the recorded user information can be read fall beyond the scope of the present invention and are therefore not described here. For these subjects reference is made to U.S. Pat. No. 4,363,116.

Figure 2:
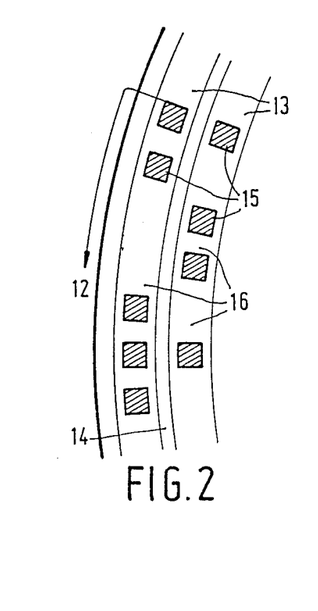
FIG. 2 shows two adjacent sector addresses of this record carrier body at an enlarged scale.
Figure 3:
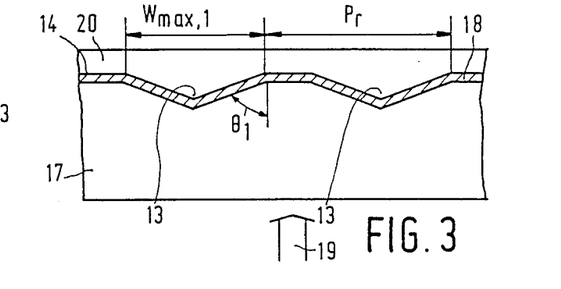
FIG. 3 is a radial sectional view of a part of said record carrier body at a location outside the sector addresses.

FIG. 2 shows part of two radially adjacent sectors of the track 10. As is shown in this Figure, the sector addresses are formed by areas 15 which alternate with intermediate areas 16 in the track direction. Between the consecutive turns of the track 10, lands 14 are situated at the same level as the intermediate areas 16. The servo track portions may comprise ridges situated on the surface of the intermediate areas 16 and the lands 14 or, as is shown in FIG. 3, grooves recessed in this surface. In the latter case, the sector address areas comprise pits in said surface, which are situated deeper than the servo grooves, as can be seen in FIG. 4.

It is to be noted that for the sake of clarity the widths of the track 10 and of the lands 14 in FIG. 1 have been exaggerated in comparison with the total surface area of the record carrier. In reality the record carrier body has a diameter of, for example, approximately 30 cm and the radial period $P_r$, i.e. the period of the track structure in the radial direction r, is, for example, 1600 nm. The length of the sector addresses has also been exaggerated in comparison with the servo track portions 13. In practice, the length of the portions 13 is, for example, 10 times the length of the sector addresses 12.

FIG. 3 is a radial sectional view of a part of the record carrier body, taken on the line 3—3' in FIG. 1, at a location where only servo-track portions 13 are situated. The servo-track portions 13 comprise grooves recessed in the surfaces of the lands 14, which grooves can be followed by means of the differential method. As set forth in British Patent Specification No. 2,034,097 these grooves have a phase depth of the order of 90°. These grooves are shallow and their walls have a large angle of inclination $\theta$, of the order of 80°. The substrate 17 carries a thin recording layer 18. This layer may be a reflecting layer, comprising, for example, bismuth or tellurium as its principal element. The track structure is then scanned with a beam which is projected from underneath and which traverses the substrate, as is indicated by the arrow 19. Moreover, a protective coating 20 may be provided on the recording layer 18.

Figure 4:
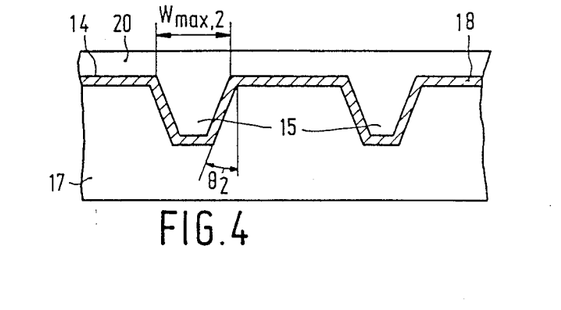
FIG. 4 is a radial sectional view of a part of said record carrier body at the location of the sector addresses.

FIG. 4 is a radial sectional view taken on the line 4—4' in FIG. 1, showing a part of the record-carrier body at the location where the sector addresses are situated. It has been assumed that at the location where the sectional view has been taken, two areas 15 are situated adjacent each other in the radial direction. As will become apparent from a comparison with FIG. 3, these areas are deeper than the servo track portions, whilst the angle of inclination $\theta_2$ is, for example, of the order of 30° to 60°.

Figure 5:
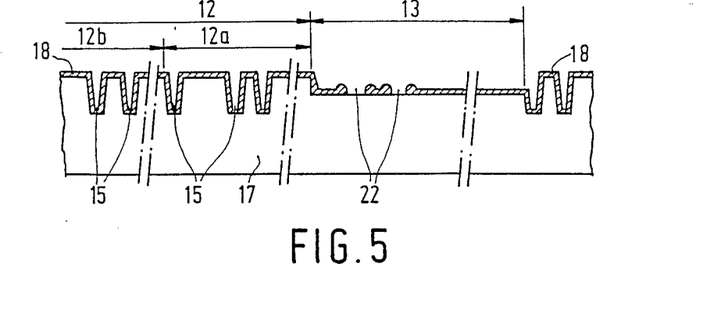
FIG. 5 is a tangential sectional view of a part of said record carrier body.

FIG. 5 is a tangential sectional view of a part of the record-carrier body, taken on the line 5—5' in FIG. 1. As shown in FIG. 5, each sector address comprises an address portion 12a and a synchronizing portion 12b, each comprising a plurality of pits 15 of uniform dimensions, recessed in the substrate. The sequence of pits in the portion 12a represents the address information. The pits in the portion 12b have a fixed spatial frequency and upon read-out they produce a clock signal for controlling, for example, the clock frequency of a signal source which serves for modulating the amplitude of the write beam with which the user records the information.

By means of a write beam whose intensity is modulated in conformity with the user information to be recorded, pits 22 can be melted in the recording layer at the location of the servo-track portion 13, so that information areas are formed which have a different reflection than the surrounding area. After the information has been recorded, the user has a record carrier in which the servo-track portions 13 and the sector addresses 12 constitute a phase structure, whilst the user information has been recorded in the form of an amplitude structure.

In accordance with the invention, as will be apparent from FIG. 1 and a comparison of FIGS. 3 and 4, the maximum width $W_{max,1}$ of the servo track portions is at least twice the maximum width $W_{max,2}$ of the sector-address areas and $W_{max1}$ is larger than half the track period in the radial direction ($P_r$), the track period being the center to center distance between adjacent tracks. In a record carrier for which $P_r = 1600$ nm and which is intended to be scanned with a radiation spot whose half-intensity value is approximately 800 nm, $W_{max,1}$ is approximately 1200 nm and $W_{max,2}$ is approximately 600 nm. The larger width of the servo-track portions ensures that the differential tracking signal has a better signal amplitude than the tracking signal obtained from record-carrier bodies known until now, in which the maximum track width is equal to the maximum width of the sector address areas and is, for example, 600 nm. An important advantage is, moreover, that for the specified width of the servo track portions 13, the information areas 22 recorded in these portions by the user can be read better by means of the integral method than such track portions 13 having a smaller width. The last-mentioned effect can be explained from the fact that the information areas 22, which differ from their surrounding area in that they have a different coefficient of reflection, can be detected better when the groove portions 13 are wider and bear greater resemblance to the flat portions of the recording layer.

The value of the maximum track width which is optimal for the differential tracking signal and the integral read signal from the sector-address areas provided by the invention is the result of insights, obtained by vectorial diffraction computations, that as the servo-track portion becomes wider the amplitudes of the second and higher diffraction orders decrease and, if the track depth remains the same, the amplitude of a first-order subbeam increases as a result of the larger volume of the servo groove or ridge, and that as the maximum track width more closely approximates the radial period of the track structure, the phase depth will come closer to the optimum value of 90°, even for larger depths of the servo track. It has been found that there is a specific value for the maximum track width above which the amplitude of the differential tracking signal hardly increases. For a record carrier body which has a period $P_r$ of the order of 1600 nm and which is scanned with a radiation spot whose half-intensity value is approximately 800 nm, said value is approximately 1200 nm.

The vectorial diffraction theory teaches that the differential tracking signal is ideal for an effective track width equal to approximately half the radial track period. For V-shaped servo grooves, this means that the maximum groove width is substantially equal to the track period, so that the grooves would adjoin each other. From the point of view of manufacturing technology this is undesirable. However, it is also found that for deviations of the order of 25% from the ideal track width, a very acceptable tracking signal can be obtained. Therefore, for practical versions of the record carrier body in accordance with the invention, the optimum value for the maximum width of the servo-track portions is of the order of 75% of the radial track period. Deviations of the order of 20% from this optimum value are permissible.

Figure 6:
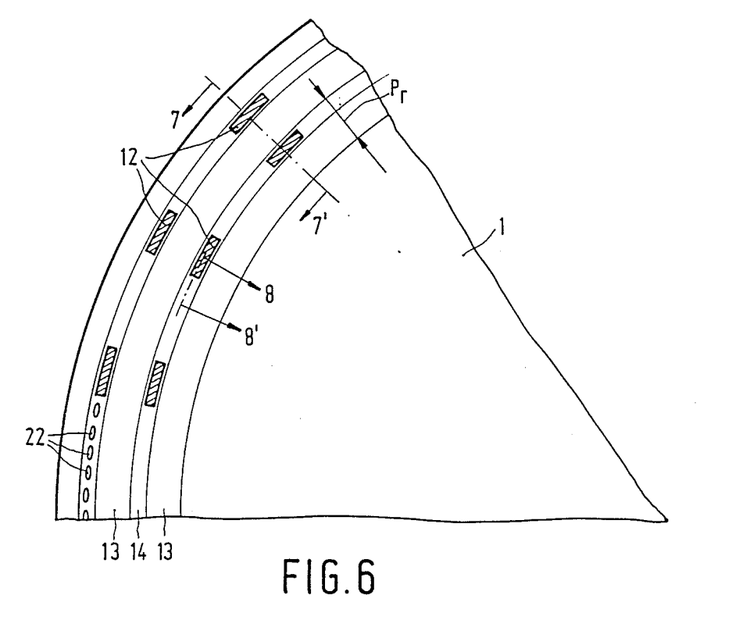
FIG. 6 is a plan view of a part of a record carrier body in accordance with a preferred embodiment of the invention.

FIG. 6 shows a record carrier body in accordance with a preferred embodiment of the invention. In this embodiment the servo-track portions adjoin each other in a tangential direction and constitute a continuous spiral track or continuous concentric tracks 13. The sector addresses are now situated between the turns of the servo track 13. The optimum value for the maximum width of the servo track 13 is again of the order of 75% of the radial period $P_r$, and the maximum track width is again at least twice the maximum width of the sector-address areas.

Figure 7:
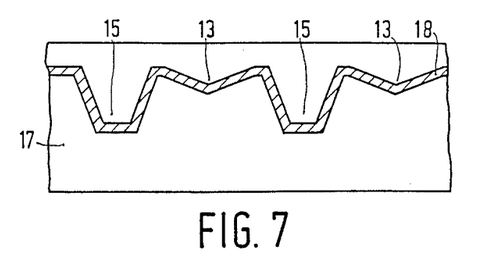
FIG. 7 is a radial sectional view of a part of said record carrier body at the location of sector addresses.
Figure 8:
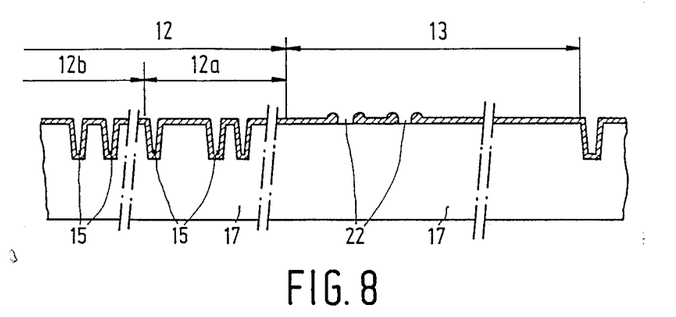
FIG. 8 is a tangential sectional view of a part of said record carrier body.

FIG. 7 is a radial sectional view of a part of this record-carrier body, taken on the line 7—7' in FIG. 6 at the location where the sector addresses are situated. It is assumed that at the location where this sectional view is taken the two areas 15 are adjacent each other in the radial direction. After the description of the first embodiment with reference to the FIGS. 3 and 4, FIG. 7 is self-explanatory. FIG. 8 is a tangential sectional view of a part of the record-carrier body, taken on the line 8—8' in FIG. 6. This Figure also requires no further explanation.

In the record-carrier body shown in FIG. 6 the information areas 22 are recorded by the user in the lands 14 between two servo-track portions 13 and between two sector addresses 12. Since the surface for recording the information areas is now entirely flat, these areas can be read even better by means of the integral method than in the case where the information areas are recorded in the wide servo track portions of the record carrier body 1 shown in FIG. 1.

It is to be noted that the recording of the user-information between the servo grooves or ridges need not be combined with a wider servo groove, but may also be applied to a record-carrier body with a narrower servo groove. Recording the information areas between the servo grooves or ridges then also has the advantage that these areas can be read more effectively.

Figure 9:
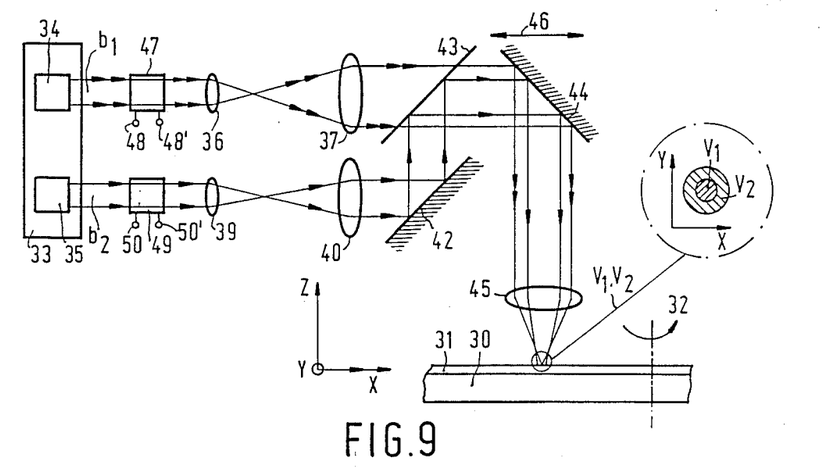
FIG. 9 shows an apparatus for recording the sector addresses and the servo-track portions, in accordance with a first embodiment of the invention.

FIG. 9 shows the basic diagram of an apparatus by means of which the sector addresses and the servo-track portions can be recorded on a master disc can be reproduced. In this Figure the reference numeral 30 denotes the, for example glass, substrate of the master disc. This substrate carries a photo-sensitive layer 31, whose thickness has been selected in such a way that the sector-address areas, formed after the developement of the photo-sensitive layer, have a depth or height which is adapted to the wavelength of the beam with which the record-carrier body is to be scanned in order to obtain the correct phase depth. A radiation-source system 33 may comprise two separate lasers 34 and 35, for example argon-ion lasers. This system produces two radiation beams $b_1$ and $b_2$, of which $b_1$ serves for recording the sector addresses and $b_2$ for recording the servo-track portions. The narrow beams are widened, for example by means of a telescope comprising lenses 36, 37 and 39, 40, respectively, the beam $b_1$ being widened more than the beam $b_2$. Thus, the beam $b_1$ is given such a width that it fills the entire entrance pupil of the objective system 45. After having traversed the telescope the beam $b_2$ is coupled into the path of the beam $b_1$ by the mirror 42 and a beam splitter, for example in the form of a beamsplitting mirror 43. A mirror 44 reflects the two beams to the objective system 45, which focusses each of the beams to form a radiation spot $V_1$ and $V_2$, respectively. Since the beam $b_1$ fills the pupil of the objective system completely, this beam is focussed to a minimal diffraction-limited radiation spot. The beam $b_2$, which does not fill the entire pupil, is focussed to form a larger radiation spot $V_2$.

By rotating the disc about the axis 32, the radiation spots $V_1$ and $V_2$ will describe one turn on the disc. For recording a spiral track or a plurality of concentric tracks, the radiation spots and the disc should be moved in a radial direction relative to each other with a constant velocity or stepwise, respectively. For this purpose, the mirror 44 and the objective system 45 may be accommodated in a housing which is moved in the direction indicated by the arrow 46.

Modulators 47 and 49, for example acousto-optical modulators, are arranged in the radiation paths of the beam $b_1$ and the beam $b_2$, respectively, to switch the intensity of the relevant beam in conformity with the signal applied to the terminals 48, 48' and 50, 50', respectively. When the sector addresses are recorded, the modulator 47 is switched between a high level and a zero level with a high frequency. In the present apparatus the modulator 49 is then set to the zero level. During the recording of the servo-track portions the modulator 47 is set to the zero level and the modulator 49 operates continuously at an intermediate level.

The exposure locally increases the solubility of the photo-sensitive layer. The desired relief pattern is obtained by a selective removal of the exposed photo-sensitive material in a development process. The depth and the width of the servo groove are determined by the intensity of the beam $b_2$ and the width of the radiation spot $V_2$, respectively. After the master disc has been developed it may be coated with, for example, a silver layer. Subsequently, this disc may be used in known manner for the manufacture of matrices, which are employed for the manufacture of a large number of replicas.

If the chief rays of the beams $b_1$ and $b_2$ are situated in the same X-Y plane, the radiation spots $V_1$ and $V_2$ are superimposed, as shown in the inset in the righthand part of FIG. 9, assuming that the mirrors 42 and 43 are disposed at angles of 45° to said chief rays. Alternatively, the radiation spots may be shifted in the tangential direction of the disc, i.e. in the Y-direction in FIG. 9, in such a way that the radiation spot $V_1$ is situated in front. For this purpose the radiation paths of the beams $b_1$ and $b_2$ should be shifted slightly relative to each other in the Y-direction.

Figure 10:
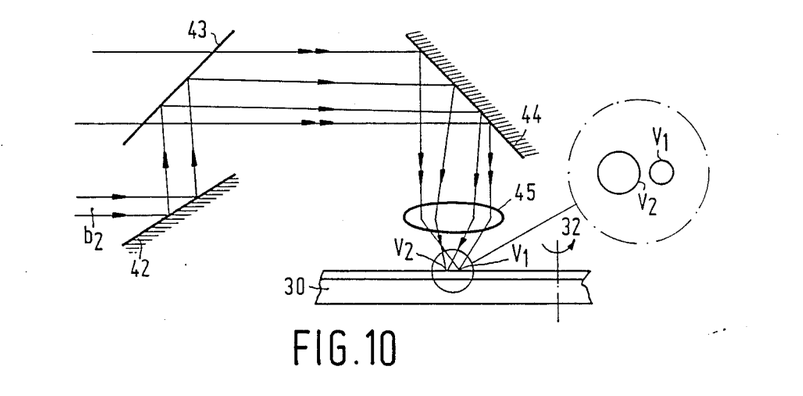
FIG. 10 shows a part of such an apparatus in accordance with a second embodiment.

For recording continuous servo tracks and sector addresses between the turns of the servo tracks, it is in principle possible to use an arrangement similar to that shown in FIG. 9, in which the modulator 49 is always at the intermediate level and the modulator 47 is switched between the high level and the zero level with a high frequency when the sector addresses are being recorded. The radial shift of the radiation spots $V_1$ and $V_2$ relative to each other can be obtained, for example, by positioning the mirror 42 at an angle which differs slightly from 45° relative to the chief ray of the beam $b_2$, as is shown in FIG. 10. This Figure shows only that part of the radiation path where the beams are given different directions, i.e. the part beginning at the mirror 42.

FIGS. 9 and 10 show the basic diagram of the apparatus for recording the sector addresses and the servo-track portions, to which a number of variants are possible. For example, the radiation-source system may comprise only one laser followed by a beam splitter. In order to minimize the loss of intensity this beam splitter and the beam splitter 43 are preferably polarisation-dependent beam splitters and the single radiation source, or the double radiation source 34, 35, should be capable of producing two beams which are polarised perpendicularly to each other. It is also possible to employ wavelength-selective beam splitters in conjunction with a single or double radiation source, emitting two different wavelengths. A shift of the radiation spots $V_1$ and $V_2$ in a radial direction, the X-direction in FIG. 9, can also be obtained by an optical wedge in the path of the beam $b_2$, the mirror 42 extending parallel to the beam-splitting mirror 43.

The user of the record-carrier body should have a combined recording/read apparatus at his disposal for recording information, reading the information be records, and for reading the sector addresses both during recording and during read out of the information. Such combined apparatus are known, for example from U.S. Pat. No. 4,363,116 and British Patent Specification No. 2,097,150. The known apparatus are suitable for use in conjunction with a record-carrier body in which the sector addresses occupy the same radial positions as the associated servo-track portions. For a record-carrier body in which the servo-track portions constitute continuous tracks and the sector addresses are situated between the turns of the servo track, the known write-/read apparatuses should be provided with means for the formation of an additional radiation spot for the purpose of tracking.

Figure 11:
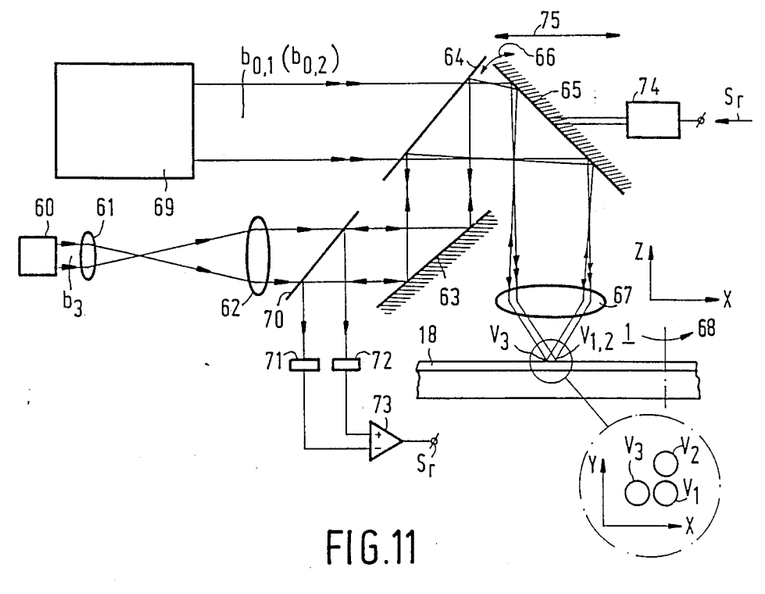
FIG. 11 shows a combined write/read apparatus for recording and reading information in a record-carrier body in accordance with the invention.

FIG. 11 shows an example of such an apparatus. This Figure only shows the elements of the tracking system. The element 60 is a radiation source, for example a diode laser, which produces a beam $b_3$. The lenses 61 and 62 constitute a beam-widening telescope which ensures that the beam $b_3$ fills the pupil of the objective system 67 correctly. Instead of the telescope, a lens may be used, which is arranged between the mirror 65 and the objective system 67. The beam reaches this objective system after reflections from the mirror 63, the beam-splitting mirror 64 and the mirror 65. The objective system focusses the beam $b_3$ to form a diffraction-limited radiation spot $V_3$ on the recording layer 18 of the record-carrier body 1. This body can be rotated about an axis 68, and the mirror 65 and the objective system 67 can together be moved in a radial direction relative to the record-carrier body, i.e. the X-direction in FIG. 11, as indicated by the arrow 75.

The mirror 63 and the beam-splitting mirror 65 serve to couple the auxiliary beam $b_3$ into the main radiation path of the apparatus, so that all the beams pass through the same objective system. The main radiation path is represented schematically by a broad beam $b_{0,1}$ ($b_{0,2}$) indicated by double arrows. The block 69 together with the mirror 66 and the objective system 67 constitute the known part of the apparatus. As is described in U.S. Pat. No. 4,363,116, it is possible to use only one radiation spot both for recording and reading. In that case the block 69 represents the optics package comprising one radiation source, for example a diode laser, a beam-widening and collimating lens system, a modulator, a radiation-sensitive detection system, and a beam splitter for diverting the radiation which has been reflected by the record carrier body to the detection system which supplies the address signals and the information signals.

Another version of the block 69 produces two radiation beams $b_{0,1}$ and $b_{0,2}$, which are focussed by the objective system to form two radiation spots $V_1$ and $V_2$ which are shifted relative to each other in the tangential direction of the record-carrier body, i..e. in the Y-direction in FIG. 11. The radiation spots $V_1$, $V_2$ and $V_3$ have the same dimensions. In the present example the block 69 comprises, for example, two diode lasers, a beam splitter for recombining the two laser beams after one of them has passed through a modulator, a second beam splitter for diverting the beams reflected by the record-carrier body, a third beam splitter for separating the two beams, and a separate detection system for each of the beams. The beam $b_{0,1}$, which forms the radiation spot $V_1$, serves for reading the clock signals and the addresses and for recording the information, and the beam $b_{0,2}$, which forms the radiation spot $V_2$, is employed for reading the information. For further details about a block 69 which is capable of producing one or two radiation beams reference is made to the U.S. Pat. No. 4,363,116 and British Patent Specification No. 2,097,150, respectively.

The auxiliary beam $b_3$ is reflected by the record-carrier body and returns along itself until it reaches a beam splitter 70. This beam splitter reflects a part of the beam $b_3$ to a radiation-sensitive detection system comprising two detectors 71 and 72. The output signals of these detectors are applied to a differential amplifier 73. The output signal $S_r$ of this ampifier contains information about the magnitude and the direction of a deviation between the center of the radiation spot $V_3$ and the central axis of the servo track. This signal is employed for correcting the radial position of the radiation spot $V_3$ and those of the radiation spots $V_1$ and $V_2$, for example by pivoting the mirror 65 in the direction indicated by the arrow 66 by means of an actuator 74 to which the signal $S_r$ is applied.

What is claimed is:

1. A record-carrier body on which information can be recorded and read by a radiation beam, comprising:
    a substantially planar substrate having on a surface thereof a succession of longitudinally extending substantially parallel information tracks which are separated from each other in a direction transverse thereto, the transverse distance between the centers of adjacent tracks defining a track period;
    each of said tracks having thereon successive sector addresses which alternate with successive servo portions along the length thereof, each sector address identifying the location of an adjoining servo portion, each sector address comprising optically detectable first areas which are spaced from each other in the longitudinal track direction by intermediate areas, said first areas having a first phase depth and said servo portions having a second phase depth differing from said first phase depth;
    the servo portions of each track being adapted to produce, when such track is scanned by a radiation beam, radiation constituting a tracking error signal signifying deviations of said beam in a direction transverse to the longitudinal track direction; said servo portions having a recording layer thereon which is modifiable so as to enable recording of information by a radiation beam of write intensity; and
    the servo portions of each track have a width in said transverse direction the maximum value of which is at least 60% of said track period and also is at least twice the maximum value of the width of said first areas in said transverse direction.

2. An apparatus for recording a succession of longitudinally extending substantially parallel information tracks on a record carrier master having a planar substrate with a layer of radiation sensitive recording material thereon, which master is used for making record carrier copies thereof; said tracks being separated from each other in a direction transverse thereto, the transverse distance between the centers of adjacent tracks defining a track period; each track having thereon successive sector portions along the length thereof; said apparatus comprising:
    means for producing first and second radiation beams;
    means for supporting said master for movement relative to said beams;
    means for periodically modulating the intensity of said first beam; and
    means for focusing said first and second radiation beams respectively into first and second scanning spots on said recording layer, said first scanning spot being smaller than and substantially concentric with said second scanning spot, so that during said relative movement said first scanning spot records successive sector address on said layer and said second scanning spot records successive servo portions thereon;
    wherein said sector address produced by said first scanning spot are in the form of optically detectable first areas which are spaced from each other in the longitudinal track direction by intermediate areas, said first areas having a first phase depth; said servo portions produced by said second scanning spot have a second phase depth differing from said first phase depth; and said maximum width of said servo portions in said transverse direction is at least 60% of said track period and at least twice the maximum value of the width of said first areas in said transverse direction.

* * * * *